United States Patent [19]

Nakagawa

[11] Patent Number: 4,538,984
[45] Date of Patent: Sep. 3, 1985

[54] HANDY TORCH

[76] Inventor: Katsuyuki Nakagawa, 1-8-2, Kobayashinishi, Taisho-ku, Osaka-shi, Osaka-fu, Japan

[21] Appl. No.: 580,721

[22] Filed: Feb. 16, 1984

[30] Foreign Application Priority Data

Jun. 8, 1983 [JP] Japan .............................. 58-86298[U]
Jul. 19, 1983 [JP] Japan ........................... 58-111077[U]

[51] Int. Cl.³ ............................................. F23Q 7/12
[52] U.S. Cl. ................................................. 431/255
[58] Field of Search ...................... 431/255, 256, 254

[56] References Cited

U.S. PATENT DOCUMENTS

| 2,127,723 | 8/1938 | Fausek et al. | 431/256 |
| 2,666,480 | 1/1954 | Peterson | 431/255 |
| 3,580,698 | 5/1971 | Goto | 431/255 |
| 4,292,021 | 9/1981 | Miyagawa | 431/255 |

*Primary Examiner*—Carroll B. Dority, Jr.
*Attorney, Agent, or Firm*—Pahl, Lorusso & Loud

[57] ABSTRACT

A butane gas type handy torch has a burner, an ignition unit for igniting a gas mixture from the burner, and a main control lever movable within a range including a gas close position, a gas open position and an ignition position for controlling gas flow from the tank and actuating a generating portion of the ignition unit by moving only the main control lever. The burner is tiltable.

8 Claims, 13 Drawing Figures

HANDY TORCH

BACKGROUND OF THE INVENTION

This invention relates to a multipurpose handy torch.

Various types of handy torch devices have been proposed and developed. One conventional torch is of pistol type. Another conventional torch includes a torch body which must be always placed on a desk or the like when it is used and the flame is oriented only in the vertical direction. Still another conventional torch has its flame oriented only in a horizontal direction.

It has been proposed in U.S. Pat. No. 4,419,072 to provide a handy torch having special complicated valve mechanisms and an inclined burner.

In the prior art handy torch, however, the burner is fixed. Therefore, it is difficult to use such a torch for multipurposes.

Also, plural control levers must be operated so that it takes a relatively long time until a flame is properly formed.

SUMMARY OF THE INVENTION

It is an object of this invention to provide a handy torch in which a burner is tiltable so that a flame can be oriented in many directions.

A further object of this invention is to provide a handy torch in which gas opening, gas closing and ignition operations can be simplified.

DETAILED DESCRIPTION OF THE PREFERRED EMBODIMENT

Figure 1:
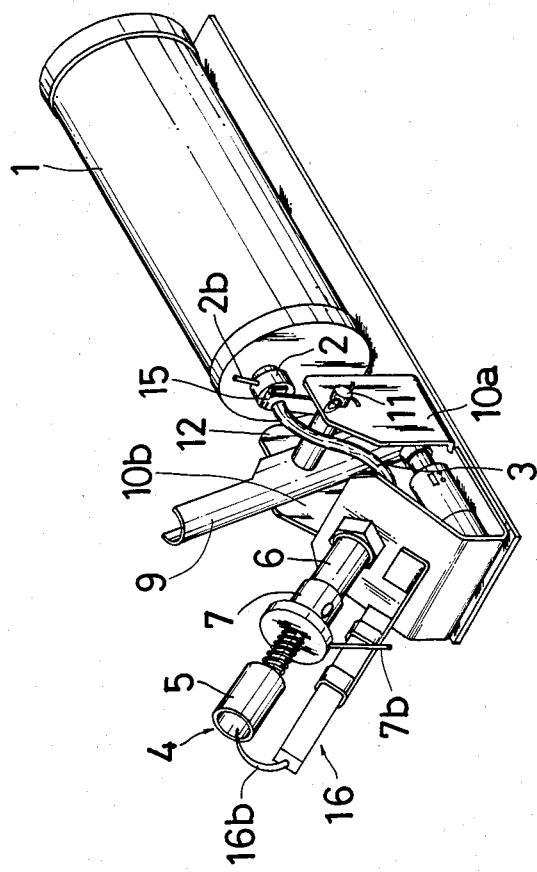
FIG. 1 is a perspective view showing a handy torch according to a first embodiment of this invention.

Referring now to FIGS. 1 through 6, a tank 1 contains therein butane gas in a liquefied state. The gas may be one for use in a gas lighter in commercial markets. A gas control valve 2 is attached to an outlet of the gas tank 1. One end of a flexible tube 3 is connected to the gas control valve 2. The gas control valve 2 is to be turned by means of a gas control lever 2b fixed thereto so as to control the amount of vaporized gas from the tank 1. The other end of the tube 3 is connected to a burner 4. The vaporized gas is mixed with air in a torch mixer 6 of the burner 4.

Figure 2:
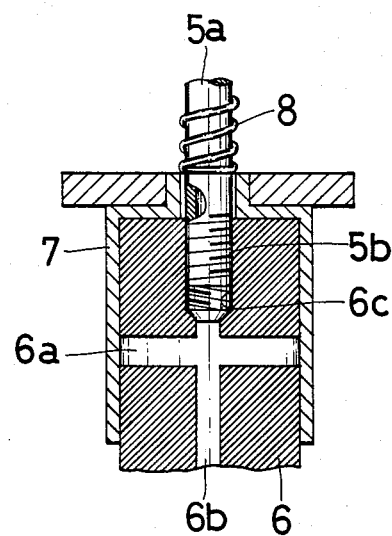
FIG. 2 is a sectional view showing a torch mixer of the handy torch shown in FIG. 1.

The burner 4 has a nozzle 5. As best shown in FIG. 2, a male screw portion 5b formed on a lower portion 5a of the nozzle 5 engages a female screw portion 6c of the mixer 6.

Figure 4:
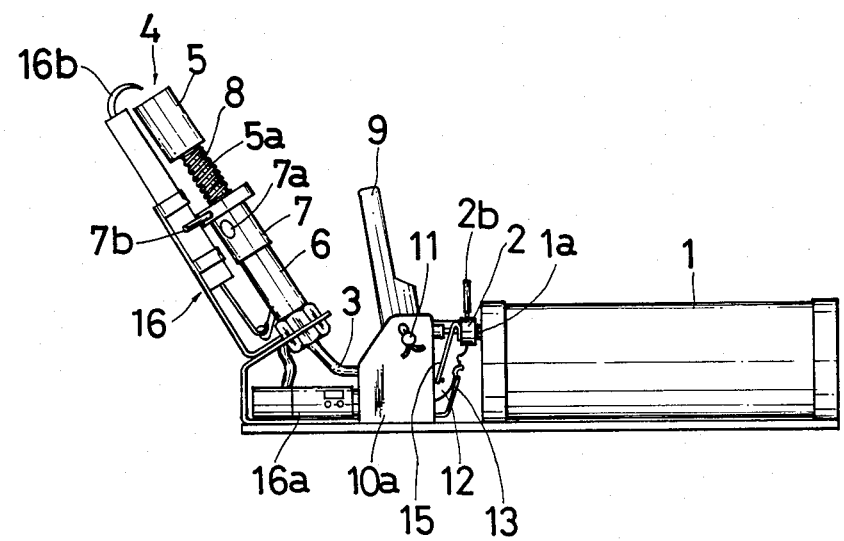
FIG. 4 is a left side view of the handy torch shown in FIG. 1.
Figure 5:
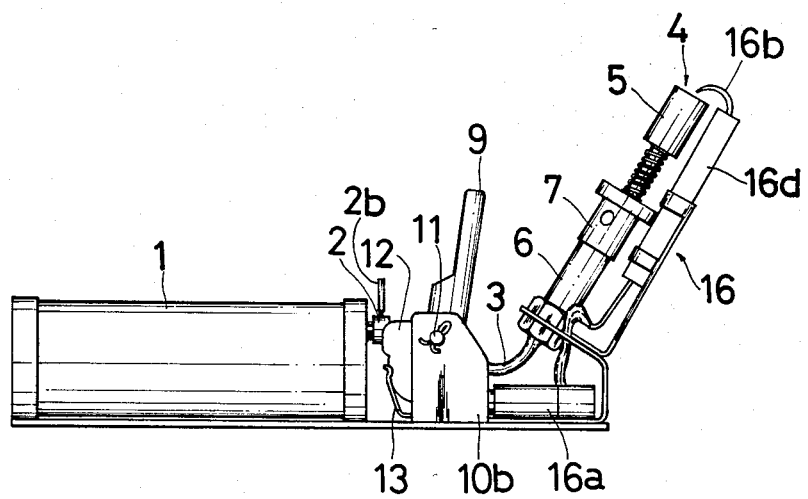
FIG. 5 is a right side view of the handy torch.

The diameter of the nozzle lower portion 5a is smaller than the diameter of a nozzle upper portion as shown in FIG. 4. For this reason, heat cannot be easily transferred from the nozzle upper portion to the nozzle lower portion 5a.

An air control valve 7 having a through hole 7a covers an end portion of the mixer 6 as shown in FIGS. 1 and 2. The air control valve 7 is biased by means of a spring 8. The air control valve 7 is rotatable about the mixer 6. A gas passage 6b is formed along the longitudinal axis of the mixer 6 and connected to the tube 3. An air-intaking passage 6a is joined with the gas passage 6b so that gas and air can be mixed. The air-gas ratio can be adjusted by changing the relative position of the through-hole 7a of the air control valve 7 to the air-intaking passage 6a of the mixer 6.

An air control lever 7b is used to turn the air control valve 7.

Figure 3:
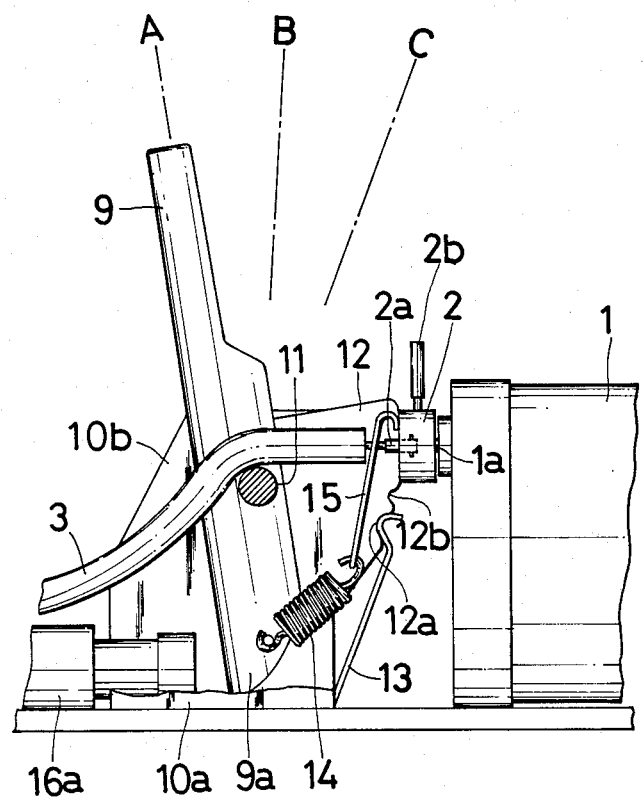
FIG. 3 is a side view showing a main control lever and its related members of the handy torch of FIG. 1.

As shown in FIG. 3, a main control lever 9 is rotatably supported about a shaft 11 by a pair of support members 10a and 10b. A locating plate 12 is fixed to the main control lever 9. The locating plate 12 has two grooves or recesses 12a and 12b which receive the upper portion of a leaf spring 13 whereby the main control lever 9 can be optionally held at the gas closing position A or the gas opening position B.

A lower end portion 9a of the main control lever 9 is connected by way of a coil spring 14 to an arm 15. An upper portion of the arm 15 is joined to a connecting member 2a of the gas control valve 2. The tube 3 is connected through the connecting member 2a to the gas control valve 2. When the connecting member 2a is pulled toward the tube 3, the vaporized gas begins to flow out of the tank 1 into the tube 3. The connecting member 2a is biased toward the gas tank 1 so that no gas normally flows out unless the connecting member 2a is pulled. That is, only when the main control lever 9 is moved to the gas opening position B, the connecting member 2a is actuated by the lower end portion of the main control lever 9 by way of the arm 15 so as to allow gas flowing out.

A typical example of an ignition unit 16 is a piezoelectric ignition unit. As well known, electric energy is produced at a generating portion 16a of the ignition unit 16, and spark occurs at an electrode 16b thereof. The generating portion 16a is actuated by the lower end portion of the main control lever 9. That is, when the main control lever 9 rotates about the shaft 11 from the gas opening position B to the ignition position C, the lower end portion 9a of the main control lever 9 presses an actuated portion of the generating portion 16a of the ignition unit 16 in a well-known manner. The main control lever 9 is returned to its original gas opening position B by the biasing force of a compression spring (not shown) contained in the generating portion 16a of the ignition unit 16.

Figure 6:
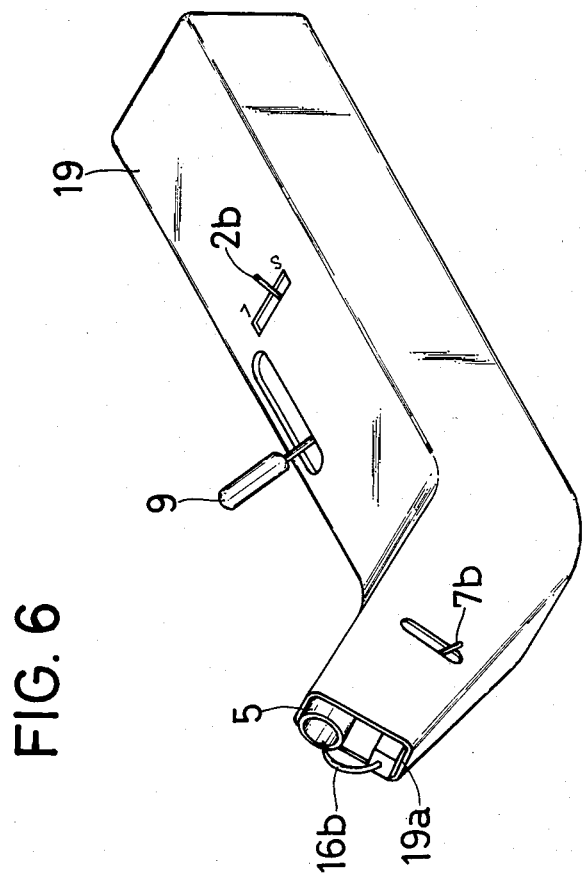
FIG. 6 is a perspective view of a handy torch having a casing in which most members of the handy torch shown in FIG. 1 are housed.
Figure 7:
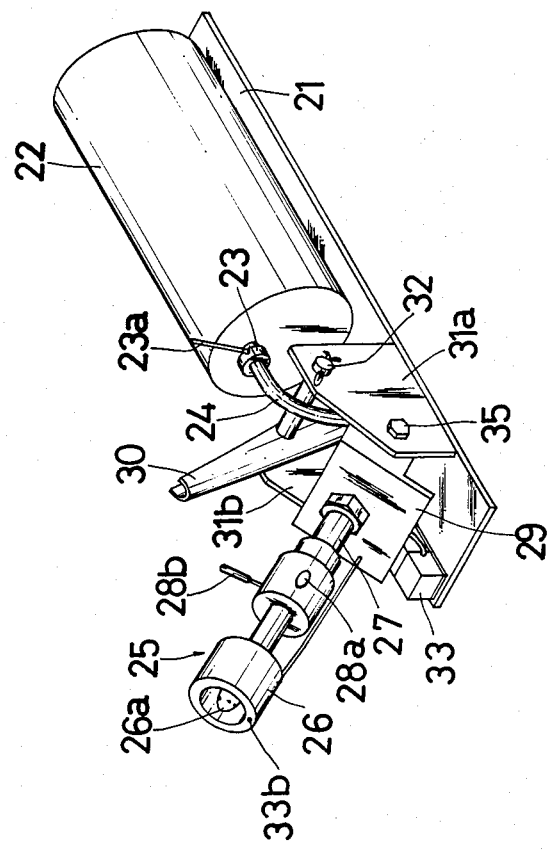
FIG. 7 is a perspective view showing a handy torch according to a second embodiment of the invention in which a casing is omitted.
Figure 8:
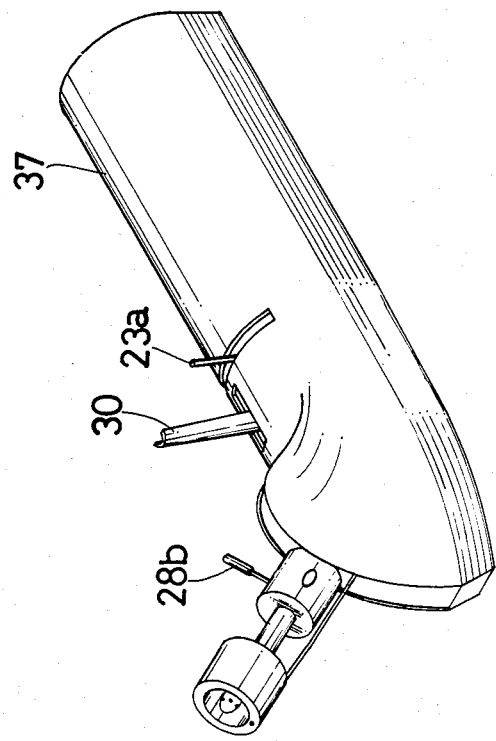
FIG. 8 is a perspective view of the handy torch of FIG. 7.
Figure 9:
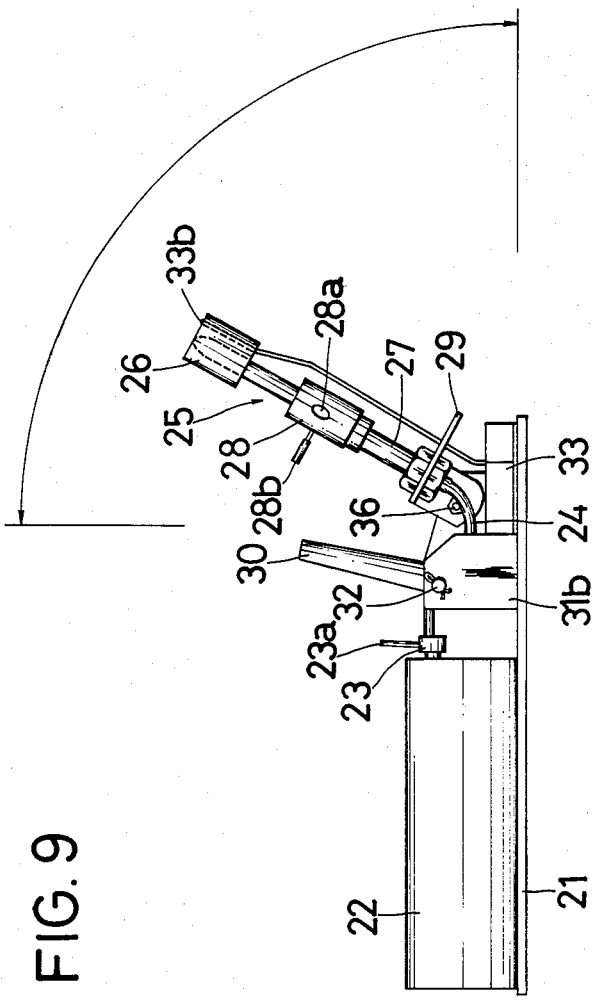
FIG. 9 is a side view of the handy torch of FIG. 7.

It is preferable that a casing 19 covers most members of the handy torch according to this invention. For example, as shown in FIG. 6, only the main control lever 9, the gas control lever 2b and the air control lever 7b are exposed for operation. The nozzle 5 and the electrode 16b of the ignition unit 16 slightly project from one open end 19a of the casing 19.

The operation of the handy torch as shown in FIGS. 1 to 6 will now be explained.

Normally, the main control lever 9 stops at the close position A. When one moves the main control lever 9 from the close position A to the open position B, the connecting member 2a is pulled by means of the arm 15. As a result, the vaporized gas flows from the tank 1 into the burner 4 by way of the tube 3. The gas is mixed with air in the mixer 6 thereby to produce an air-gas mixture. Such a mixture jets through the nozzle 5.

When one further moves the gas control lever 9 from the open position B to the ignition position C, electric spark occurs at the electrode 16b so that the mixture can be ignited to form a flame.

In practice, it is usual that the main control lever 9 is continuously moved from the close position A to the ignition position C by one step operation. Thereafter, if the operator's hand is removed from the main control lever 9, the main control lever 9 automatically returns to the open position B from the ignition position C by the biasing force of the spring. Then, the main control lever 9 is maintained at the gas open position B by means of the locating plate 12.

If the main control lever 9 is moved from the gas open position B to the close position A, the gas flow stops.

As can be seen from the foregoing, only one finger is required to the main control lever 9 in one-step in order to accomplish all of the gas closing gas ignition and gas opening operations.

Figure 10:
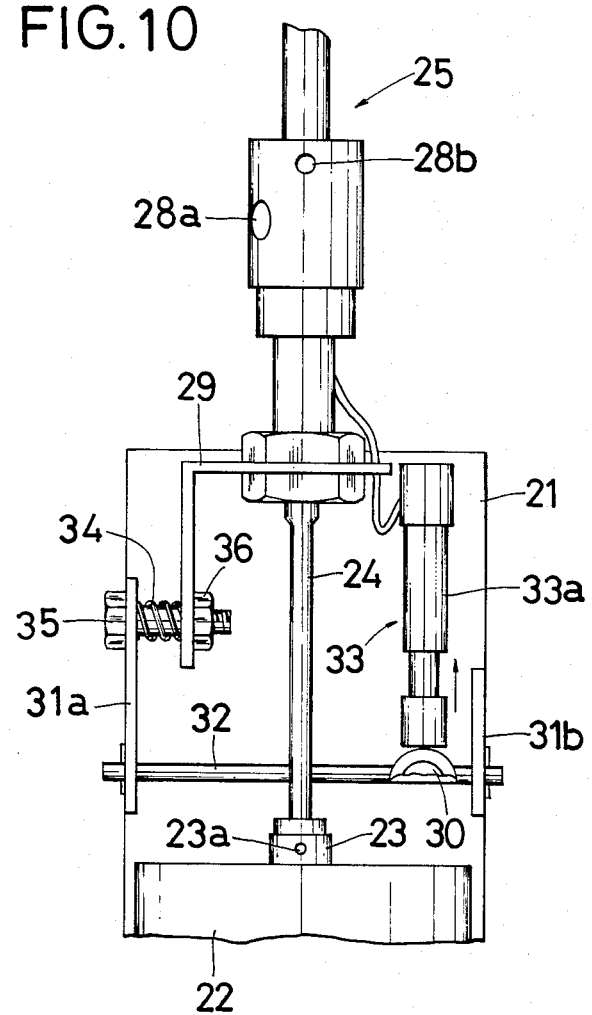
FIG. 10 is a plan view showing a tilt mechanism of the handy torch of FIG. 7.
Figure 11:
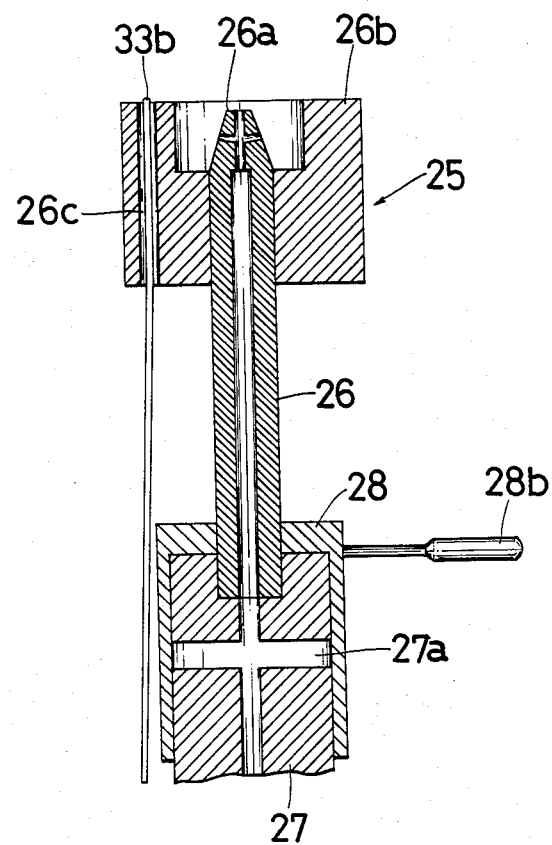
FIG. 11 is a sectional view showing a torch mixer of the torch of FIG. 7.

FIGS. 7 through 13 show another embodiment of this invention in which a burner is tiltable. Fixed on a base 21 are a tank 22, an ignition unit 33, two supporting plates 31a and 31b. A burner 25 has a nozzle 26 and a torch mixer 27. The mixer 27 penetrates through a support member 29 and is fixed thereto. As shown in FIG. 10, the support member 29 is formed in a L-shape and rotatably supported at its leg portion by a bolt 35 and a nut 36 relative to the support plate 31a against the biasing force of a coil spring 34. Therefore, the burner 25 is tiltable about the bolt 35. It is preferable that the burner 25 is tiltable within 90° from the horizontal position as shown by the arrow in FIG. 9.

The force retaining the position of the burner 25 can be adjusted by screwing the nut 36 into the bolt 35 so as to compress the coil spring 34. The burner 25 can be retained at any angle by means of the biasing force of the coil spring 34.

The ignition unit 33 having the generating unit 33a and the electrode 33b, the main control lever 30 rotatable about the shaft 32, the tank 22, the gas control valve 23, the gas control lever 23a, the flexible tube 24, the burner 25, the nozzle 26, and its tip 26a, the torch mixer 27 having the air intake passage 27a and the gas intake passage 27b, the air control valve 28 having the hole 2a, the air control lever 28b and the casing 37 are the same way as in the embodiment of FIGS. 1 through 6 so that the details thereof need not be explained again.

A cover 26b made of ceramics for a flame at the nozzle tip 26a is fixed to an upper portion of the nozzle 26. The electrode 33b penetrates through a guide hole 26c of the cover 26b.

Except with regard to the tilt mechanism of the burner 25 and its related members, the operation of those members is substantially the same as that of the embodiment of FIGS. 1 through 6.

Figure 12:
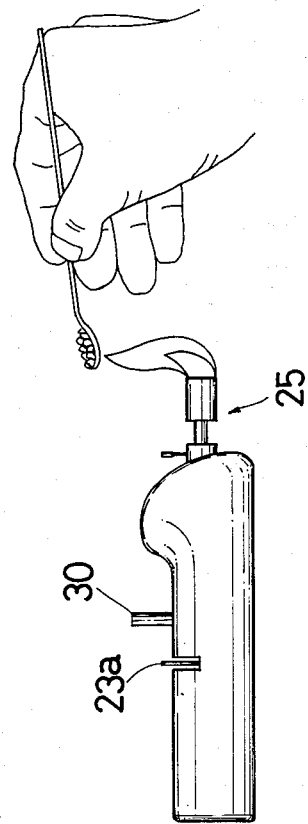
FIG. 12 shows a condition in which a burner of the torch of FIG. 7 is horizontally set.

FIG. 12 shows that the burner 25 is horizontally set. In this condition, fused wax never drops into the nozzle tip 26a.

Figure 13:
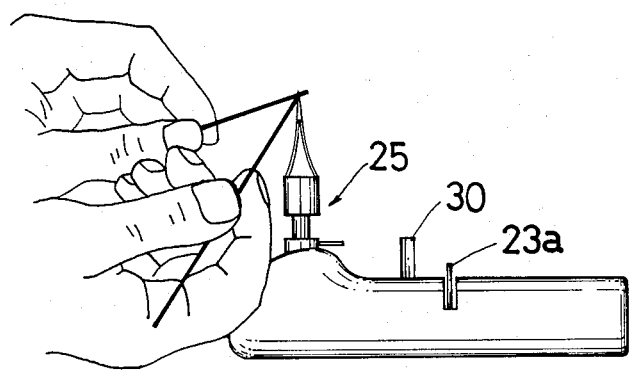
FIG. 13 shows a condition in which a burner of the torch is vertically set.

In FIG. 13, the burner 25 is vertically set.

As can be seen from the foregoing, the torch mixer 25 can be positioned at any angle.

According to this invention, the handy torch provides superior efficiency either when using a desk or handling by hand and wide ranges of uses. The handy torch is most suitable for melting, casting, welding, soldering and waxing works in every field, including:

(a) Dental and other medical treatments.
(b) Spectacles and optical instruments.
(c) Handiworks such as glassware, chasing, etc.
(d) Experimental purpose in schools, laboratories, etc.
(e) Repairs of precision instruments, maintenances, etc.

I claim:

1. A handy torch for operation with a tank containing a fuel gas, the tank having a valve providing open and closed positions, said handy torch comprising:
    a frame member for holding the tank;
    a burner pivotally mounted on said frame member and including a nozzle and a mixing valve for mixing the fuel gas with air;
    a conduit connecting said mixing valve with the tank valve;
    an igniter having an electrode, positioned close to said nozzle, and an actuator;
    a manually operative main control level pivotally mounted on said frame for movement between gas open, gas closed and ignition positions, said actuator being positioned to engage said main control lever only in said ignition position and said main control lever being operatively connected to the tank valve for movement of the valve between the open and close positions so that, by a single movement of main control lever, gas is released from the tank and ignited.

2. The handy torch of claim 1 further comprising a tiltable bracket holding said burner and a fixed bracket mounted on said frame member, said tiltable bracket being pivotally mounted on said fixed bracket.

3. The handy torch of claim 2 wherein said tiltable and fixed brackets are separated by a tiltable spring and are pinned together through said spring, said spring biasing said tiltable bracket in one direction.

4. The handy torch of claim 1 further comprising a stop member resiliently biased against said main control lever and wherein said main control lever has at least two notches, corresponding to said gas open and gas closed positions, for receiving said stop member.

5. The handy torch of claim 1 wherein said gas open position is intermediate said gas closed and ignition positions.

6. The handy torch of claim 1 further comprising means for resiliently biasing said tank valve toward the gas closed position.

7. The handy torch of claim 1 wherein said igniter is a piezo-electric igniter.

8. The handy torch of claim 4 wherein said gas open position is intermediate said gas closed and ignition positions.

* * * * *